United States Patent
Elshaer

(10) Patent No.: US 12,418,235 B2
(45) Date of Patent: Sep. 16, 2025

(54) POWER FACTOR CORRECTION CIRCUIT CONFIGURED AS ISOLATED THREE-PHASE RESONANT DC/DC CONVERTER FOR BIDIRECTIONAL POWER FLOW

(71) Applicant: FORD GLOBAL TECHNOLOGIES, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 186 days.

(21) Appl. No.: 18/463,726

(22) Filed: Sep. 8, 2023

(65) Prior Publication Data

US 2025/0088096 A1 Mar. 13, 2025

(51) Int. Cl.
| | | |
|---|---|---|
| *H02M 7/219* | (2006.01) | |
| *B60L 50/60* | (2019.01) | |
| *H02M 1/42* | (2007.01) | |
| *H02M 1/44* | (2007.01) | |
| *H02M 3/335* | (2006.01) | |
| *H02P 27/06* | (2006.01) | |

(52) U.S. Cl.
CPC .......... *H02M 1/4233* (2013.01); *B60L 50/60* (2019.02); *H02M 1/44* (2013.01); *H02M 3/33573* (2021.05); *H02M 7/219* (2013.01); *H02P 27/06* (2013.01); *B60L 2210/10* (2013.01); *B60L 2210/30* (2013.01)

(58) Field of Classification Search
None
See application file for complete search history.

(56) References Cited

U.S. PATENT DOCUMENTS

| | | | |
|---|---|---|---|
| 2017/0282747 A1 | 10/2017 | Wang | |
| 2022/0393574 A1* | 12/2022 | Pervaiz | ............ H02M 3/33592 |
| 2022/0416679 A1* | 12/2022 | Wang | ................... H02M 1/0058 |
| 2024/0190276 A1* | 6/2024 | Absar | ..................... B60L 50/60 |
| 2025/0047206 A1* | 2/2025 | Cao | ........................ H02M 1/007 |

FOREIGN PATENT DOCUMENTS

| | | |
|---|---|---|
| CN | 108448913 A | 8/2018 |
| CN | 114123821 A | 3/2022 |
| JP | 2022531025 A | 7/2022 |
| KR | 20210050555 A | 5/2021 |

* cited by examiner

*Primary Examiner* — Jared Fureman
*Assistant Examiner* — Joel Barnett
(74) *Attorney, Agent, or Firm* — David B. Kelley; Brooks Kushman P.C.

(57) ABSTRACT

An automotive power system has a first circuit arrangement including an AC/DC power converter, a transformer, a switching bridge connected between the AC/DC power converter and transformer, and a plurality of switches connected with an output of the transformer and that connect the output between an electric machine and another switching bridge such that windings of the electric machine, the switching bridges, and the transformer form an isolated DC/DC power converter.

20 Claims, 8 Drawing Sheets

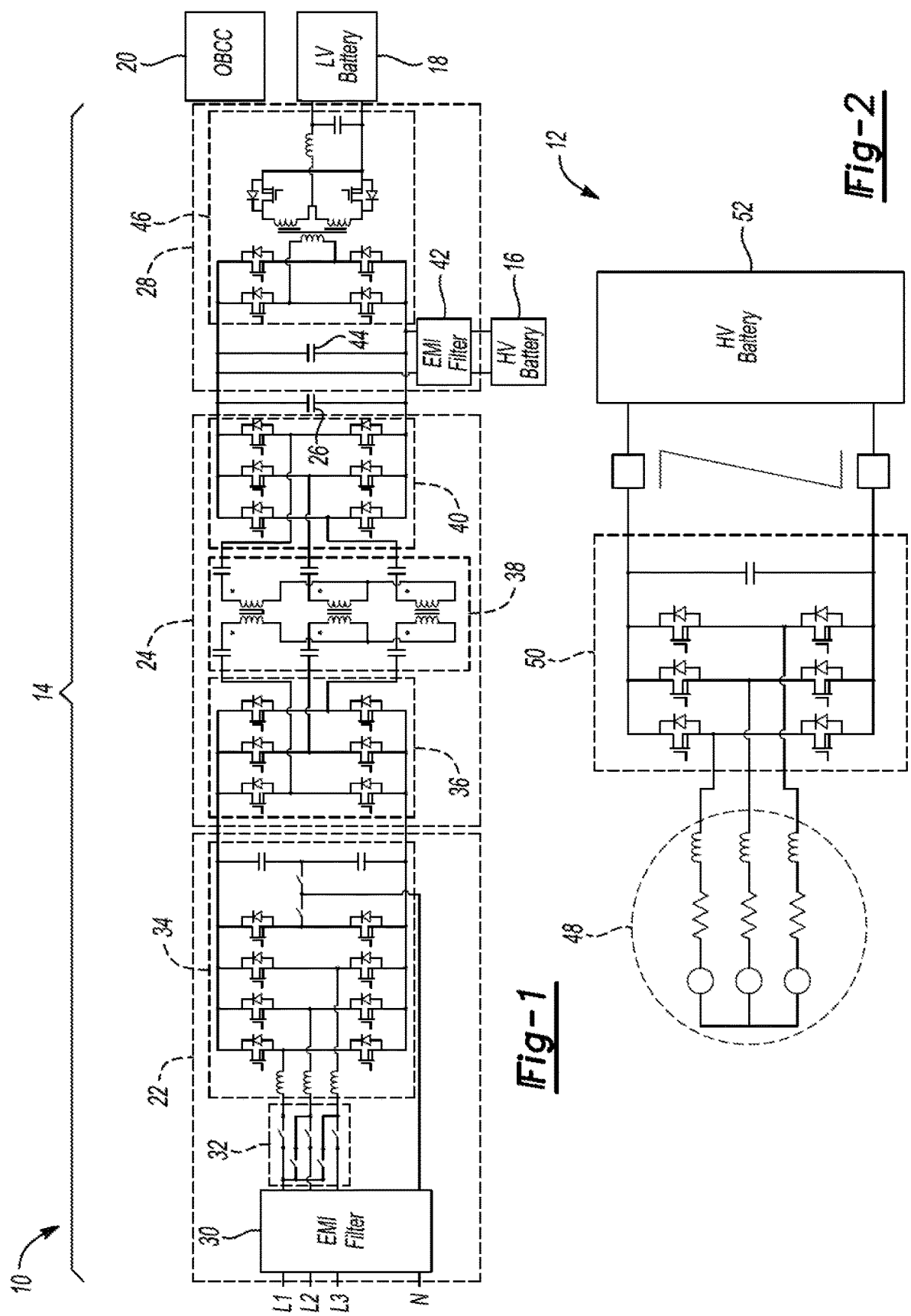

POWER FACTOR CORRECTION CIRCUIT CONFIGURED AS ISOLATED THREE-PHASE RESONANT DC/DC CONVERTER FOR BIDIRECTIONAL POWER FLOW

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive power system includes a first switching bridge, a first circuit arrangement including an AC/DC power converter with a plurality of inductors, a transformer, a second switching bridge connected between the AC/DC power converter and transformer, and a plurality of switches connected with an output of the transformer and that connect the output with the first switching bridge such that the first switching bridge is connected between a traction battery and transformer, and the first switching bridge, transformer, and second switching bridge form an isolated DC/DC power converter. The system further includes a first electromagnetic interference filter, a switch bank connected between the inductors and electromagnetic interference filter, and a second circuit arrangement including a third switching bridge and a plurality of windings magnetically coupled with the inductors.

A vehicle includes a traction battery, an electric machine, a first switching bridge connected between traction battery and electric machine, and a first circuit arrangement. The first circuit arrangement includes an AC/DC power converter with a plurality of inductors and a plurality of switches, a transformer, a second switching bridge connected between the AC/DC power converter and transformer, and a plurality of switches connected with an output of the transformer and that connect the output between the electric machine and first switching bridge such that windings of the electric machine, the first switching bridge, the transformer, and the second switching bridge form an isolated DC/DC power converter. The vehicle further includes a switch bank connected with the inductors such that the inductors are connected between the switches of the AC/DC power converter and the switch bank, and a second circuit arrangement including a third switching bridge and a plurality of windings magnetically coupled with the inductors.

An automotive power system includes a first circuit arrangement including an AC/DC power converter, a transformer, a switching bridge connected between the AC/DC power converter and transformer, and a plurality of switches connected with an output of the transformer and configured to connect the output between an electric machine and another switching bridge such that windings of the electric machine, the switching bridges, and the transformer form an isolated DC/DC power converter. The system further includes a second circuit arrangement including an electromagnetic interference filter and a plurality of windings magnetically coupled with the inductors.

BRIEF DESCRIPTION OF THE DRAWINGS

FIG. 1 is a schematic diagram of a system including a battery current control module.

FIG. 2 is a schematic diagram of a system including an inverter system controller.

DETAILED DESCRIPTION

Figure 3:
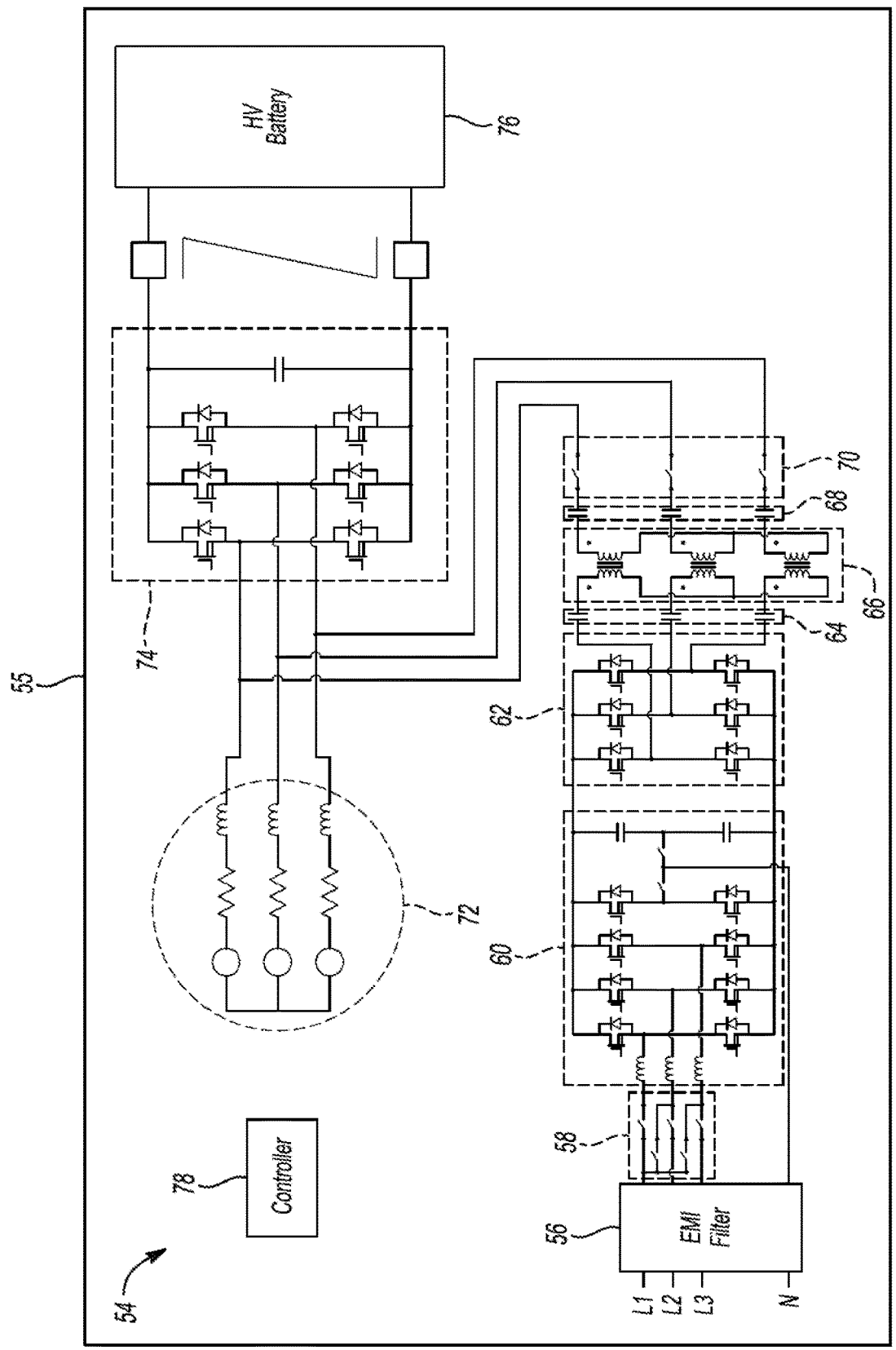
FIG. 3 is a schematic diagram of a system including an integrated battery current control module and inverter system controller.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in managing the flow of electric current to and from the battery.

BCCMs function as control units that interface between the battery, the charging system, and the electrical loads. They monitor and control various parameters such as battery state of charge, voltage, and temperature, and based on this information, they manage the flow of current to the battery.

BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance.

Similarly, BCCMs may be responsible for discharging control. They can manage the current output from the battery to the electrical loads in the vehicle. By controlling the current flow, BCCMs may ensure a controlled supply of power to the various electrical components and systems.

BCCMs may also implement various measures for the battery. For instance, they may monitor battery temperature to prevent overheating. They may also detect overvoltage or undervoltage situations and implement measures to preclude short circuits or excessive current draw.

Communication interfaces are often incorporated into BCCMs. These interfaces, such as Controller Area Network (CAN) or LIN (Local Interconnect Network), allow BCCMs to exchange information with other vehicle systems, including the engine control unit (ECU) or the body control module (BCM). This enables coordinated operation and integrated control across various vehicle functions. BCCMs can receive commands or instructions from other control units and adjust current flow accordingly.

BCCMs may feature diagnostic capabilities. These modules can monitor the health and performance of the battery system. They can log codes and provide diagnostic information, facilitating maintenance.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor.

ISCs may act as a decision maker for the power electronics system. It may monitor various parameters such as motor speed, torque, and temperature to ensure operation.

A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller manages the speed and torque output of the electric motor.

ISCs may provide control over the electric motor. They may use algorithms and control strategies to manage motor speed, torque, and direction of rotation. By adjusting the switching patterns of the IGBTs, the controller can vary the frequency and amplitude of the AC waveform, altering motor operation.

ISCs can facilitate regenerative braking. During slowing or braking, the electric motor operates as a generator, converting the vehicle's kinetic energy into electrical energy. The inverter system controller may control the flow of energy, directing it back to the battery for storage.

ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures.

ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit (ECU) and adjust the power output accordingly.

ISCs may incorporate features such as overvoltage and undervoltage monitoring, overcurrent monitoring, and isolation monitoring.

Integrating the BCCM with the ISC is conventionally considered a challenge due to the disconnecting circuitry. The schematics of typical separate systems 10, 12 are shown in FIGS. 1 and 2, respectively.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electromagnetic interference filter 30, a switch bank 32, and AC/DC power converter circuitry 34. The switch bank 32 is connected between the electromagnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electromagnetic interference filter 42, a capacitor 44, and high voltage to low voltage power converter circuitry 46. The electromagnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18.

The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts-making electric level integration unfavorable. Package level integration, however, can provide advantages since it reduces the overall package size and/or weight, and the number of connectors and wires. Here, a new circuit topology is proposed that addresses some of the disconnect circuitry's issues. The schematics of such a system 54 is shown in FIG. 3 within the context of vehicle 55.

Referring to FIG. 3, the system 54 includes an electromagnetic interference filter 56, a switch bank 58, an AC/DC power converter 60, a switching bridge 62, a capacitor bank 64, a transformer 66, a capacitor bank 68, a switch bank 70, an electric machine 72 a switching bridge 74, a traction battery 76, and a controller 78.

The switch bank 58 is connected between the electromagnetic interference filter 56 and AC/DC power converter 60. The switching bridge 62 is connected between the AC/DC power converter 60 and capacitor bank 64. The transformer 66 is connected between the capacitor banks 64, 68. The capacitor bank 68 is connected between the transformer and switch bank 70. The transformer 66 is thus also connected between the switching bridge 62 and switch bank 70.

The switching bridge 74 is connected between the electric machine 72 and traction battery 76.

The controller 78 is in communication with and/or exerts control over the components illustrated in FIG. 3.

The switch bank 70 is connected with a secondary side of the transformer 66: When switches of the switch bank 70 are closed, the transformer 66 is connected between the electric machine 72 and switching bridge 74 such that the switching bridge 62, transformer 66, electric machine 72, and switching bridge 74 form an isolated DC/DC power converter. The controller 78 may close the switches of the switch bank 70 responsive to a request to charge the traction battery 76. When closed energy received from, for example, a grid received at the electromagnetic interference filter 56 via L1, L2, L3, and N may be conditioned and transferred through the now formed isolated DC/DC power converter to the traction battery 76. The controller 78 may operate switches of the AC/DC power converter 60 and switching bridges 62, 64, for example, at 300 kHz when the switches of the switch bank 70 are closed (i.e., during charge mode.) When the charge is complete, the controller 78 may open the switches of the switch bank 70. The controller 78 may operate the switches of the switching bridge 64, for example, at 30 kHz (or less) when the switches of the switch bank 70 are open (e.g., during drive mode). Other switch speeds, of course, may be used.

The circuit topology presented in FIG. 3 allows for integrating a BCCM (the electromagnetic interference filter 56, switch bank 58, AC/DC power converter 60, switching bridge 62, capacitor bank 64, transformer 66, capacitor bank 68, and switch bank 70) with an ISC without using high current contractors. The add-on circuitry is interfaced directly with the ISC without disconnecting the electric machine or traction battery. The add-on circuitry includes a front-end AC/DC power factor correction circuit and portions of the isolated high voltage DC/DC circuit that is part of the BCCM. Three relays are added for disconnecting the add-on circuitry from the ISC during drive mode. The BCCM's high voltage DC/DC circuit can be designed considering the electric machine's stator winding impedance and its variations with respect to rotor position. When the vehicle is plugged into the AC grid, the add-on circuitry, ISC, and electric motor form a bidirectional AC/DC-DC/AC power converter. The BCCM's high voltage DC/DC power converter can be designed to switch at a frequency much higher than the ISC's switching frequency.

Figure 4:
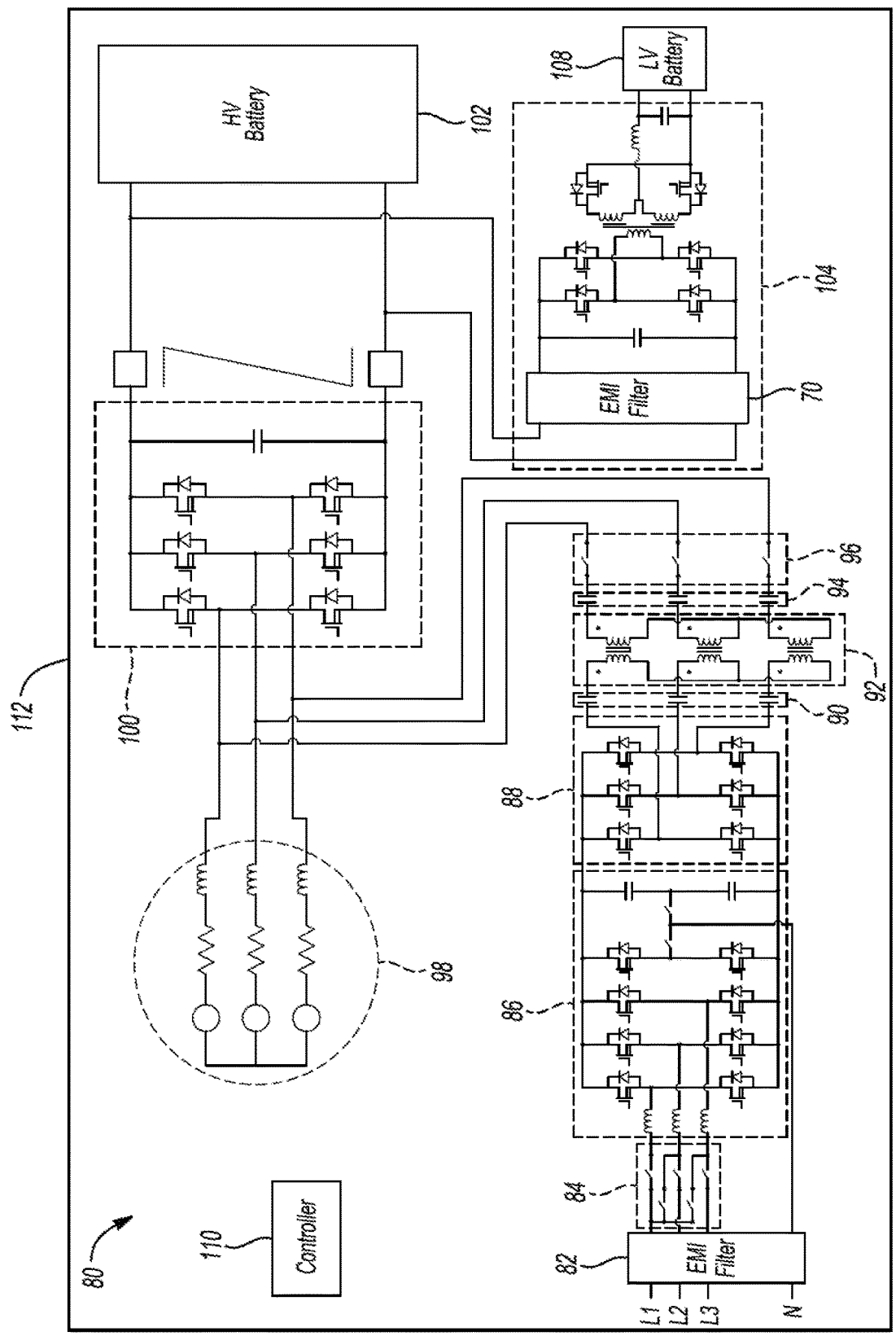
FIG. 4 is a schematic diagram of a system including an integrated battery current control module, inverter system controller, and high voltage to low voltage DC/DC converter.

Referring to FIG. 4, a system 80 includes an electromagnetic interference filter 82, a switch bank 84, an AC/DC power converter 86, a switching bridge 88, a capacitor bank 90, a transformer 92, a capacitor bank 94, a switch bank 96, an electric machine 98, a switching bridge 100, a traction battery 102, a high voltage to low voltage DC/DC power converter 104, an auxiliary battery 106, and a controller 110. These components are shown within the context of vehicle 112. The controller 110 is in communication with and/or exerts control over the components illustrated in FIG. 4.

The electromagnetic interference filter 82, switch bank 84, AC/DC power converter 86, switching bridge 88, capacitor bank 90, transformer 92, capacitor bank 94, switch bank 96, electric machine 98, switching bridge 100, and traction battery 102 are arranged, and can be operated by the controller 110, in a manner similar to FIG. 3.

The high voltage to low voltage DC/DC power convert 104 is connected between the switching bridge 100 and traction battery 102. It is further connected with the auxiliary battery 108 such that, when the high voltage to low voltage DC/DC power converter 104 is operating, power from the switching bridge 100 may flow through the high voltage to low voltage DC/DC power converter 104 to the auxiliary battery 108.

Integrating the BCCM (the electromagnetic interference filter 82, switch bank 84, AC/DC power converter 86, switching bridge 88, capacitor bank 90, transformer 92, capacitor bank 94, and switch bank 96) with the inverter system controller (the switch bank 100) is estimated to increase the ISC's package size by 50%. With a larger package size, the module's location may be constrained. Hence, there is a need to reduce packaging size.

The high voltage to low voltage DC/DC power converter 104 contributes to the required packaging space. In some arrangements, the high voltage circuit of the high voltage to low voltage DC/DC power converter 104 consumes almost half of its overall size. The following topology eliminates the high voltage circuit.

Figure 5:
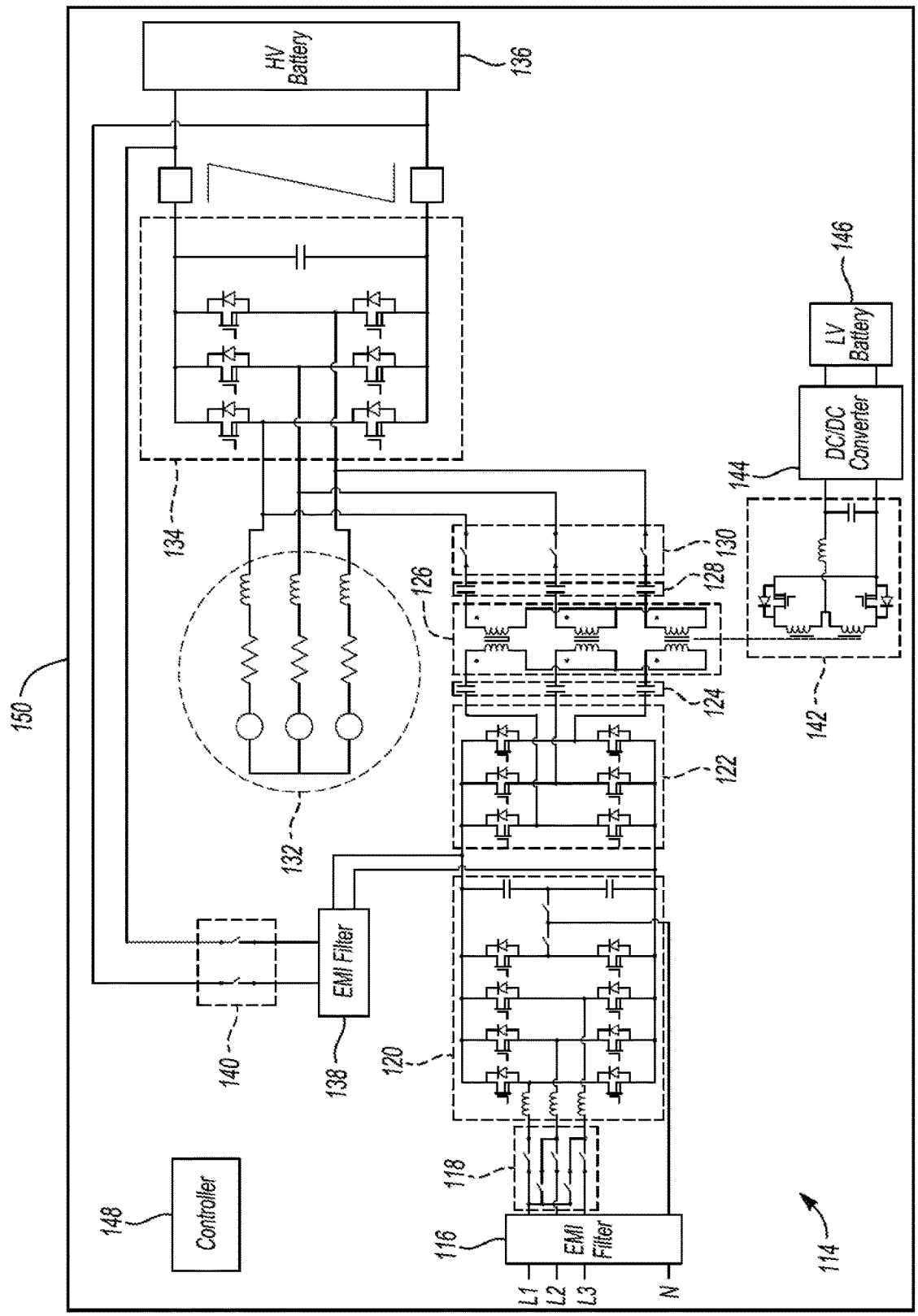
FIG. 5 is a schematic diagram of a system including an integrated battery current control module, inverter system controller, rectifier, and DC/DC converter.

Referring to FIG. 5, a system 114 includes an electromagnetic interference filter 116, a switch bank 118, an AC/DC power converter 120, a switching bridge 122, a capacitor bank 124, a transformer 126, a capacitor bank 128, a switch bank 130, an electric machine 132, a switching bridge 134, a traction battery 136, an electromagnetic interference filter 138, a switch bank 140, a rectifier 142, a DC/DC power converter, an auxiliary battery 146, and a controller 148. These components are shown within the context of vehicle 150.

The electromagnetic interference filter 116, switch bank 118, AC/DC power converter 120, switching bridge 122, capacitor bank 124, transformer 126, capacitor bank 128, switch bank 130, electric machine 132, switching bridge 134, and traction battery 136 are arranged in, and can be operated by the controller 148, in a manner similar to FIGS. 3 and 4. The components of FIG. 5 are thus in communication with and/or under the control of the controller 148.

The electromagnetic interference filter 138 is directly connected between the AC/DC power converter 120 and switch bank 122. The switch bank 140 is arranged to connect the electromagnetic interference filter 138 directly with the traction battery 136 such that power output from the AC/DC power converter 120 may flow directly to the traction battery 136 via the electromagnetic interference filter 138 and switch bank 140.

The rectifier 142 is magnetically coupled with the transformer 126 via a low voltage coil and common core. The DC/DC power converter 144 is connected between the rectifier 142 and auxiliary battery 146 such that power from the transformer 142 may flow through the rectifier 142 and DC/DC power converter 144 to the auxiliary battery 146. The DC/DC power converter 144 may provide additional power management to the auxiliary battery 146.

The rectifier 142 may be implemented as a center-tap rectifier, a full-bridge rectifier, a half-bridge rectifier, a current doubler, etc. The low voltage coil can be implemented as a center-tap coil or single coil. The rectifier 142 rectifies the voltage induced across the low voltage coil for delivering DC power to the auxiliary battery 146.

As alluded to above, the switch bank 140 electrically connects the traction battery 136 to the BCCM's intermediate DC bus. When the vehicle 150 is disconnected from the AC grid or is in drive mode, all other relays, including the switch bank 130, are open. The BCCM's intermediate DC bus is energized by closing the switch bank 140. An isolated high voltage to low voltage DC/DC power converter is thus configured for charging the auxiliary battery 146. The transformer's primary windings and low voltage coil are energized for charging/discharging the auxiliary battery 146.

When the vehicle 150 is connected to the AC grid, the controller 148 generates commands such that the switch bank 140 is open, and the switch bank 130 is closed. The switch bank 118 is configured depending on grid type (e.g., single-phase, two-phase, three-phase, etc.). All transformer windings are energized to allow for bidirectional power flow between the AC grid and the traction battery 136, and between the traction battery 136 and auxiliary battery 146.

While this level of integration enables the elimination of the rectifier and electromagnetic interference filter that are part of the AC/DC battery charger, there is still opportunity to reduce the package size further. The electromagnetic interference filter 138 and series capacitors (electrolytic capacitor bank) of the AC/DC power converter 120 may consume 50% of the overall space. Here, an active ripple energy storage circuit is proposed to reduce the electrolytic capacitor size by, for example, up to 70%. This active ripple energy storage circuit may be configured as a bidirectional DC/DC converter to provide added functionality when the vehicle is disconnected from the AC grid Referring to FIG. 6, a system 152 includes an electromagnetic interference filter 154, a switch bank 156, an AC/DC power converter 158, an active ripple energy storage circuit 159, switches 160, a secondary bus 161, a switching bridge 162, a capacitor bank 164, a transformer 166, a capacitor bank 168, a switch bank 170, an electric machine 172, a switching bridge 174, a traction battery 176, an electromagnetic interference filter 178, a switch bank 180, a rectifier 182, an auxiliary battery 184, and a controller 186. These components are shown within the context of vehicle 188.

Figure 6:
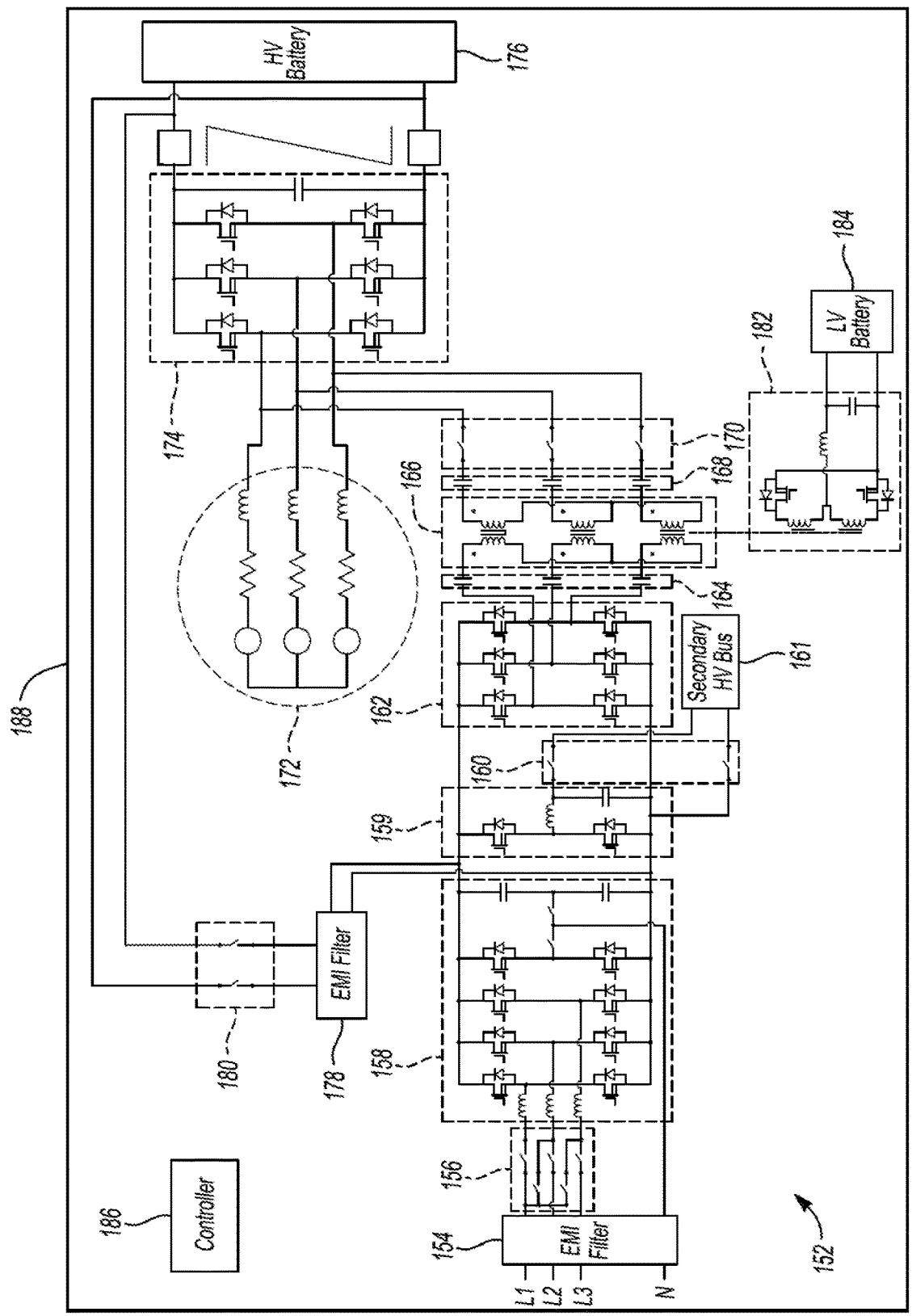
FIG. 6 is a schematic diagram of a system including an active ripple energy storage circuit, integrated battery current control module, inverter system controller, rectifier, and DC/DC converter.

The electromagnetic interference filter 154, switch bank 156, AC/DC power converter 158, switching bridge 162, capacitor bank 164, transformer 166, capacitor bank 168, switch bank 170, electric machine 172, switching bridge 174, and traction battery 176 are arranged in (with the exception of the active ripple energy storage circuit 159, switches 160, and secondary bus 161), and can be operated by the controller 186, in a manner similar to FIGS. 3 and 4. The components of FIG. 6 are thus in communication with and/or under the control of the controller 186.

The electromagnetic interference filter 178 is directly connected between the active ripple energy storage circuit 159 and switch bank 162. The active ripple energy storage circuit 159 is thus connected between the AC/DC power converter 158 and switching bridge 162. The switch bank 180 is arranged to connect the electromagnetic interference filter 178 directly with the traction battery 176 such that power output from the AC/DC power converter 158 may flow directly to the traction battery 176 via the electromagnetic interference filter 178 and switch bank 180.

The rectifier 182 is magnetically coupled with the transformer 166 via a low voltage coil and common core such that power from the transformer 142 may flow through the rectifier 182 to the auxiliary battery 184. As with FIG. 5, this topology may include a DC/DC power converter to provide additional power management to the auxiliary battery 184.

The rectifier 182 may be implemented as a center-tap rectifier, a full-bridge rectifier, a half-bridge rectifier, a current doubler, etc. The low voltage coil can be implemented as a center-tap coil or single coil. The rectifier 182 rectifies the voltage induced across the low voltage coil for delivering DC power to the auxiliary battery 184.

As alluded to above, the switch bank 180 electrically connects the traction battery 176 to the BCCM's intermediate DC bus. When the vehicle 188 is disconnected from the AC grid or is in drive mode, all other relays, including the switch bank 170, are open. The BCCM's intermediate DC bus is energized by closing the switch bank 180. An isolated high voltage to low voltage DC/DC power converter is configured for charging the auxiliary battery 184. The transformer's primary windings and low voltage coil are energized for charging/discharging the auxiliary battery 184.

When the vehicle 188 is connected to the AC grid, the controller 186 generates commands such that the switch bank 180 is open, and the switch bank 170 is closed. The switch bank 156 is configured depending on grid type (e.g., single-phase, two-phase, three-phase, etc.). All transformer windings are energized to allow for bidirectional power flow between the AC grid and the traction battery 176, and between the traction battery 176 and auxiliary battery 184.

The active ripple energy storage circuit 159 is designed to absorb the low-frequency ripple voltage across the electrolytic capacitors during single-phase operation. This converter acts as a charge/discharge circuit with net zero power. It is further designed using a bidirectional buck/boost converter. The high voltage input is connected to the BCCM's intermediate DC bus, and the low voltage output is connected to a film capacitor interfaced to a receptacle via disconnect switches.

While the vehicle 188 is disconnected from an AC grid or in drive mode, the high voltage to low voltage DC/DC converter is energized from the BCCM's intermediate DC bus for charging the auxiliary battery 184. The switch bank 180 is closed to interface the traction battery 176 to the BCCM's intermediate DC bus, and the switch bank 170 is opened for disconnecting the switching bridge 174 from the BCCM circuit. The active ripple energy storage circuit 159 is used to form a non-isolated buck converter for stepping down the voltage of the traction battery 176 (e.g., 800V) to a lower voltage level (e.g., 400V). The switches 160 are closed to connect loads (not directly connected to the traction battery 176) to the secondary (non-isolated) bus 184.

For vehicle to vehicle DC charging (while the vehicle 188 is not in drive mode), switches are configured to form two cascaded power conversion circuits. The first stage is an isolated high voltage DC/DC converter, and the second stage is a step-down non-isolated buck converter. The switch bank 180 is opened to disconnect the BCCM's intermediate DC bus from the traction battery 176. The switch bank 170 is closed to connect the switching bridge 174 to the BCCM circuit. The switches 160 are closed to interface the buck converter's output to a receptacle, enabling plugging in another vehicle. The high voltage to low voltage DC/DC converter is energized directly from the traction battery 176 via the switching bridge 174. Power flows to the auxiliary battery 184 through the transformer's secondary windings and low voltage coil. The intermediate DC bus voltage energizes the add-on buck converter. Power flows from the traction battery 176 through the transformer's secondary windings to the transformer's primary windings. For vehicle to vehicle charging, the buck converter's output voltage/current is controlled to change an external high voltage battery based on a reference command.

While the vehicle 188 is connected to an AC grid, switches are configured to form isolated high voltage AC/DC-DC/AC and high voltage to low voltage DC/DC charging/discharging circuits. The switch bank 180 is opened to disconnect the BCCM's intermediate DC bus from the traction battery 176. The switch bank 170 is closed to connect the switching bridge 174 to the BCCM. The switches 160 are opened to disconnect the secondary bus 184 from the active ripple energy storage circuit 159. The circuit operates as described previously, except when plugging the vehicle 188 into a single-phase grid. The active ripple energy storage circuit 159 circuit is activated if single-phase input is detected to minimize the low-frequency ripple voltage across the electrolytic capacitors.

Integrating the battery current control module (BCCM) with the inverter system controller (ISC) eliminates the BCCM's rectifier as alluded to above. For a system where the auxiliary high voltage to low voltage DC/DC converter is magnetically coupled to the BCCM's transformer, additional relays are required for connecting the BCCM's intermediate DC bus to the high voltage traction battery. Hence, the BCCM's intermediate DC bus is not isolated.

There may be ways to reconfigure the circuit in FIG. 6 as an isolated DC/DC converter. The following circuit topologies use a three-phase totem-pole power factor correction circuit (i.e., AC circuit) to construct a bi-directional isolated three-phase capacitor-inductor-inductor-capacitor resonant DC/DC converter.

The front-end totem-pole power factor correction circuit, which is part of the BCCM, can be modified to construct an isolated three-phase DC/DC converter. A second winding can be coupled to the three power factor correction inductors to form a loosely coupled three-phase transformer (k~0.4-0.7). By opening all relays in the switch box, the primary side of the constructed loosely coupled transformer can be configured as a Y-connection. The three front-end x-capacitors primarily used for filtering the switching supply noise can be configured in series with the loosely coupled transformer's primary windings. The add-on circuit can consist of three windings magnetically coupled to the power factor correction's inductors, three resonant capacitors, a three-phase inverter/rectifier, and an electromagnetic interference filter. The loosely coupled transformer's secondary windings can also be configured as a Y-connection with a series resonant capacitor with each winding. The secondary side capacitors can match the reactance and minimize reactive power circulation in the transformer and switching devices.

Figure 7A:
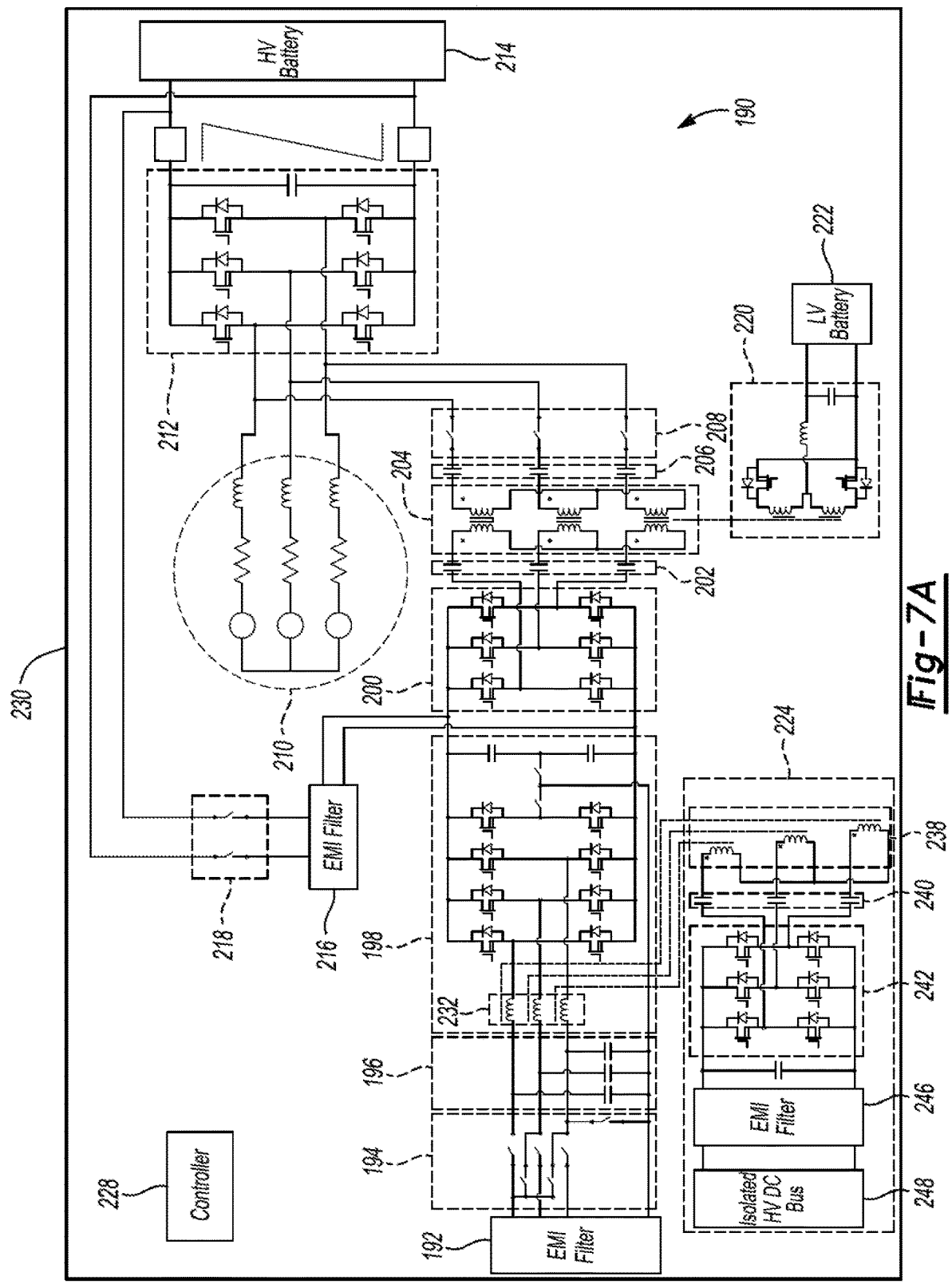
FIGS. 7A-7C are schematic diagrams of systems including circuit arrangements coupled with inductors.

Referring to FIG. 7A, a system 190 includes an electromagnetic interference filter 192, a switch bank 194, a capacitor bank 196, an AC/DC power converter 198, a switching bridge 200, a capacitor bank 202, a transformer 204, a capacitor bank 206, a switch bank 208, an electric machine 210, a switching bridge 212, a traction battery 214, an electromagnetic interference filter 216, a switch bank 218, a rectifier 220, an auxiliary battery 222, a circuit arrangement 224, a DC bus 226, and a controller 228. These components are shown within the context of vehicle 230.

The electromagnetic interference filter 192, switch bank 194, AC/DC power converter 198, switching bridge 200, capacitor bank 202, transformer 204, capacitor bank 206, switch bank 208, electric machine 210, switching bridge 212, traction battery 214, electromagnetic interference filter 216, switch bank 218, rectifier 220, and auxiliary battery 222 are arranged in (with the exception of the capacitor bank 196, circuit arrangement 224, and DC bus 226), and can be operated by the controller 228, in a manner similar to FIG. 6, and other of the previous figures. The components of FIG. 7A are thus in communication with and/or under the control of the controller 228.

The AC/DC power converter 198 includes a plurality of inductors 232. The circuit arrangement 224 includes a plurality of windings 238, a capacitor bank 240, a switching bridge 242 (e.g., a three-phase switching bridge), and an electromagnetic interference filter 246. The capacitor bank 196 is connected between the switch bank 194 and AC/DC power converter 198 such that each of the capacitors of the capacitor bank 196 is connected in series with one of the inductors of the AC/DC power converter 198.

Each of the windings of the plurality of windings 238 is magnetically coupled with one of the inductors of the AC/DC power converter 198. The capacitor bank 240 is connected between the plurality of windings 238 and switching bridge 242. The switching bridge 242 is connected between the capacitor bank 240 and electromagnetic interference filter 246. The electromagnetic interference filter 246 is connected between the DC bus 226 and switching bridge 242.

The front-end x-capacitors can be split into two capacitors banks and connected before and after the switch box. The value of the capacitors after the switch box can be optimized to realize the reactance matching requirement for the capacitor-inductor-inductor-capacitor converter. The capacitors before the switch box can be optimized to filter the differential mode current generated by the switching power supply.

Figure 7B:
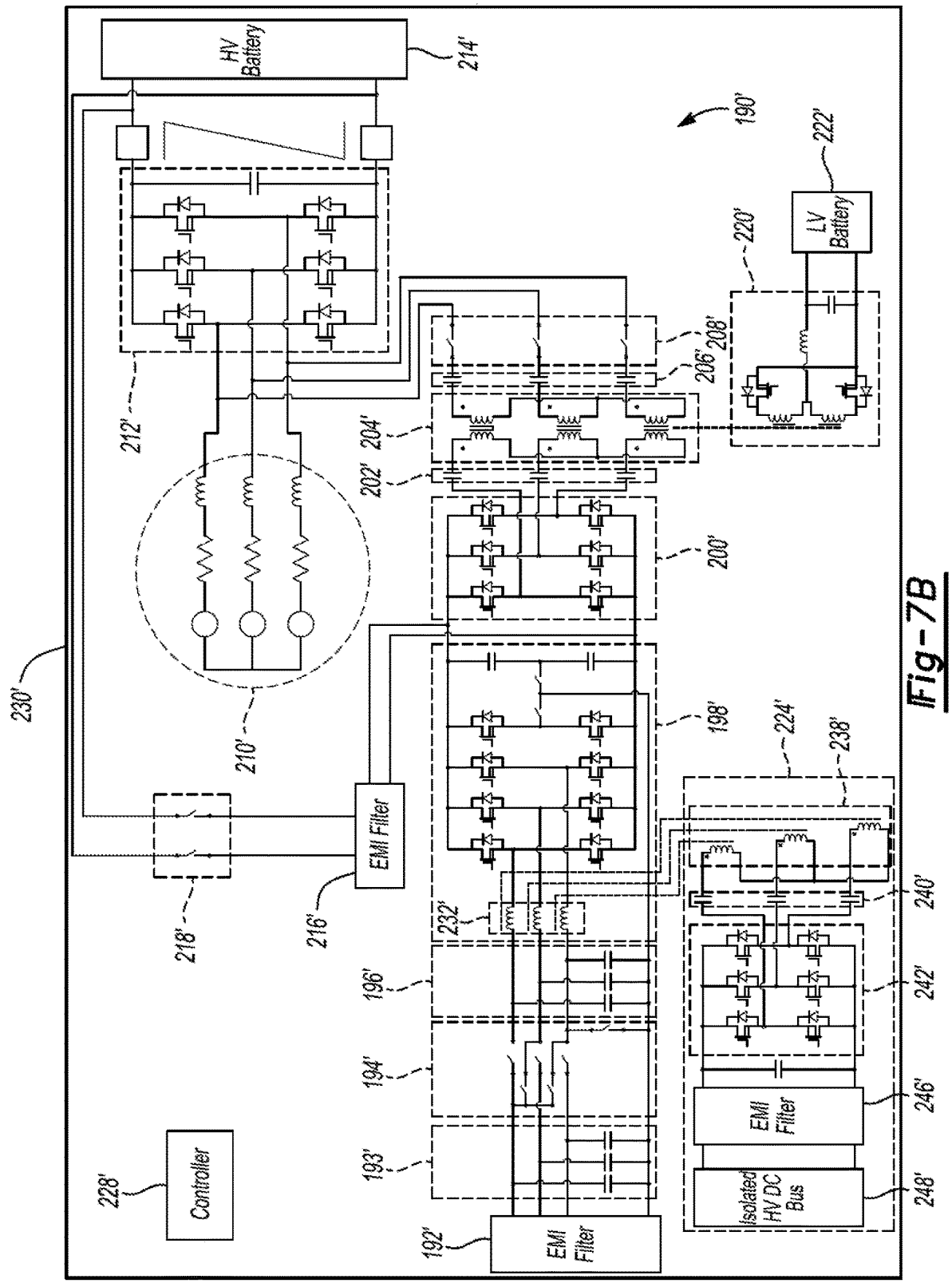

Referring to FIG. 7B, a system 190' includes an electromagnetic interference filter 192', a capacitor bank 193', a switch bank 194', a capacitor bank 196', an AC/DC power converter 198', a switching bridge 200', a capacitor bank 202', a transformer 204', a capacitor bank 206', a switch bank 208', an electric machine 210', a switching bridge 212', a traction battery 214', an electromagnetic interference filter 216', a switch bank 218', a rectifier 220', an auxiliary battery 222', a circuit arrangement 224', a DC bus 226', and a controller 228'. These components are shown within the context of vehicle 230'.

The AC/DC power converter 198' includes a plurality of inductors 232'. The circuit arrangement 224' includes a plurality of windings 238', a capacitor bank 240', a switching bridge 242', and an electromagnetic interference filter 246'.

The architecture of FIG. 7B is thus a variation of that shown in FIG. 7A with the addition of the capacitor bank 193' connected between the electromagnetic filter 192' and switch bank 194'.

Switches can be added for decoupling the secondary windings from the power factor correction inductor when using the BCCM to charge the high voltage battery from the AC grid.

Figure 7C:
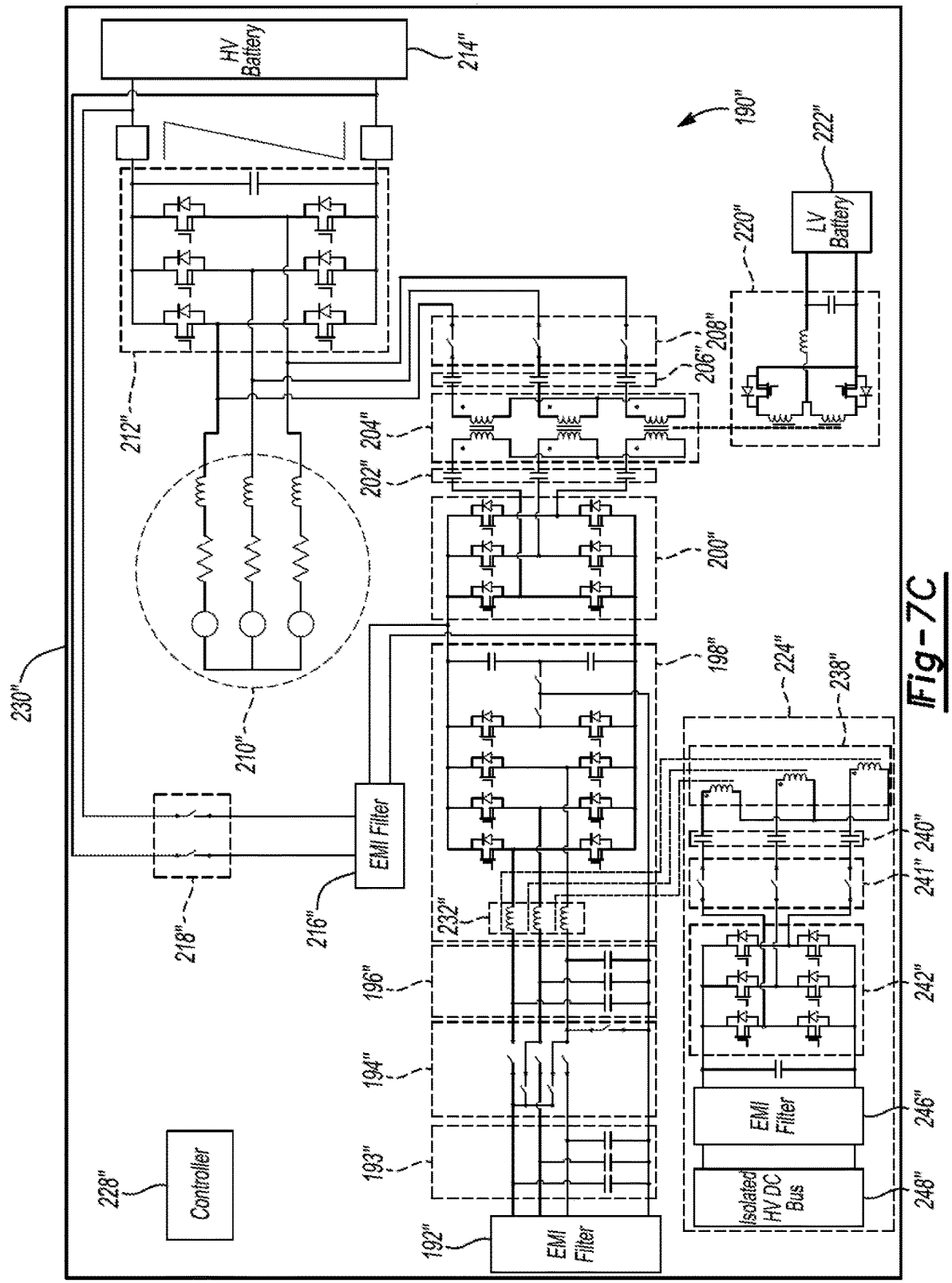

Referring to FIG. 7C, a system 190" includes an electromagnetic interference filter 192", a capacitor bank 193", a switch bank 194", a capacitor bank 196", an AC/DC power converter 198", a switching bridge 200", a capacitor bank 202", a transformer 204", a capacitor bank 206", a switch bank 208", an electric machine 210", a switching bridge 212", a traction battery 214", an electromagnetic interference filter 216", a switch bank 218", a rectifier 220", an auxiliary battery 222", a circuit arrangement 224", a DC bus 226", and a controller 228". These components are shown within the context of vehicle 230".

The AC/DC power converter 198" includes a plurality of inductors 232". The circuit arrangement 224" includes a plurality of windings 238", a capacitor bank 240", a switch bank 241", a switching bridge 242", and an electromagnetic interference filter 246". The switch bank 241" is connected between the capacitor bank 240" and switching bridge 242", and can be opened during charge of the traction battery 214" to disconnect the switching bridge 242" from the plurality of windings 238".

The architecture of FIG. 7C is thus a variation of that shown in FIG. 7B with the addition of the switch bank 241".

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The capacitor banks 124, 128 could instead be inductor banks, or capacitor and inductor banks. The symbols used to represent capacitors of the capacitor banks 124, 128 can thus also represent inductors of such inductor banks, or represent capacitors and inductors of such capacitor and inductor banks. The switching bridges 122, 134 may be n-phase inverters or n-phase rectifiers depending on topology and functionality requirements, etc. The switching bridge 122, for example, may be configured as a single phase inverter by removing one of its phase legs.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
a first switching bridge;
a first circuit arrangement including an AC/DC power converter with a plurality of inductors, a transformer, a second switching bridge connected between the AC/DC power converter and transformer, and a plurality of switches connected with an output of the transformer and configured to connect the output with the first switching bridge such that the first switching bridge is connected between a traction battery and the transformer, and the first switching bridge, transformer, and second switching bridge form an isolated DC/DC power converter;
a first electromagnetic interference filter;
a switch bank connected between the inductors and first electromagnetic interference filter; and
a second circuit arrangement including a third switching bridge and a plurality of windings magnetically coupled with the inductors.

2. The automotive power system of claim 1 further comprising a plurality of first capacitors connected between the inductors and the switch bank such that each of the first capacitors is in series with one of the inductors.

3. The automotive power system of claim 2 further comprising a plurality of second capacitors connected between the first electromagnetic interference filter and the switch bank.

4. The automotive power system of claim 1, wherein the second circuit arrangement further includes a second electromagnetic interference filter and wherein the third switching bridge is connected between the windings and second electromagnetic interference filter.

5. The automotive power system of claim 4, wherein the second circuit arrangement further includes a DC bus and wherein the second electromagnetic interference filter is connected between the third switching bridge and DC bus.

6. The automotive power system of claim 1, wherein the third switching bridge is a three-phase power converter.

7. The automotive power system of claim 1, wherein the second circuit arrangement further includes a plurality of capacitors connected between the third switching bridge and windings.

8. The automotive power system of claim 1, wherein the second circuit arrangement further includes a plurality of switches connected between the third switching bridge and windings.

9. The automotive power system of claim 8, wherein the plurality of switches connected between the third switching bridge and windings are configured to be open during charge of the traction battery to disconnect the third switching bridge from the windings.

10. The automotive power system of claim 1 further comprising one or more switches configured to connect the traction battery between the AC/DC power converter and second switching bridge.

11. A vehicle comprising:
a traction battery;
an electric machine;
a first switching bridge connected between the traction battery and electric machine;
a first circuit arrangement including an AC/DC power converter with a plurality of inductors and a plurality of switches, a transformer, a second switching bridge connected between the AC/DC power converter and transformer, and a plurality of switches connected with an output of the transformer and configured to connect the output between the electric machine and first switching bridge such that windings of the electric machine, the first switching bridge, the transformer, and the second switching bridge form an isolated DC/DC power converter;

a switch bank connected with the inductors such that the inductors are connected between the switches of the AC/DC power converter and the switch bank; and a second circuit arrangement including a third switching bridge and a plurality of windings magnetically coupled with the inductors.

12. The vehicle of claim 11, wherein the second circuit arrangement further includes an electromagnetic interference filter and wherein the third switching bridge is connected between the windings and the electromagnetic interference filter.

13. The vehicle of claim 12, wherein the second circuit arrangement further includes a DC bus and wherein the electromagnetic interference filter is connected between the third switching bridge and the DC bus.

14. The vehicle of claim 11 further comprising a plurality of first capacitors connected between the inductors and the switch bank such that each of the first capacitors is in series with one of the inductors.

15. The vehicle of claim 14 further comprising a plurality of second capacitors connected with the switch bank such that the switch bank is connected between the first and second capacitors.

16. The vehicle of claim 11, wherein the third switching bridge is a three-phase power converter.

17. The vehicle of claim 11, wherein the second circuit arrangement further includes a plurality of switches connected between the third switching bridge and the windings.

18. The vehicle of claim 17, wherein the plurality of switches connected between the third switching bridge and windings are configured to be open during charge of the traction battery to disconnect the third switching bridge from the windings.

19. An automotive power system comprising:

a first circuit arrangement including an AC/DC power converter, a transformer, a switching bridge connected between the AC/DC power converter and transformer, and a plurality of switches connected with an output of the transformer and configured to connect the output between an electric machine and another switching bridge such that windings of the electric machine, the switching bridges, and the transformer form an isolated DC/DC power converter; and a second circuit arrangement including an electromagnetic interference filter and a plurality of windings magnetically coupled with inductors of the AC/DC power converter.

20. The automotive power system of claim 19, wherein the second circuit arrangement further includes a plurality of switches connected between the electromagnetic interference filter and the windings of the second circuit arrangement.

* * * * *